April 12, 1938.   J. KRISS   2,114,227
CLAMP
Filed April 23, 1936
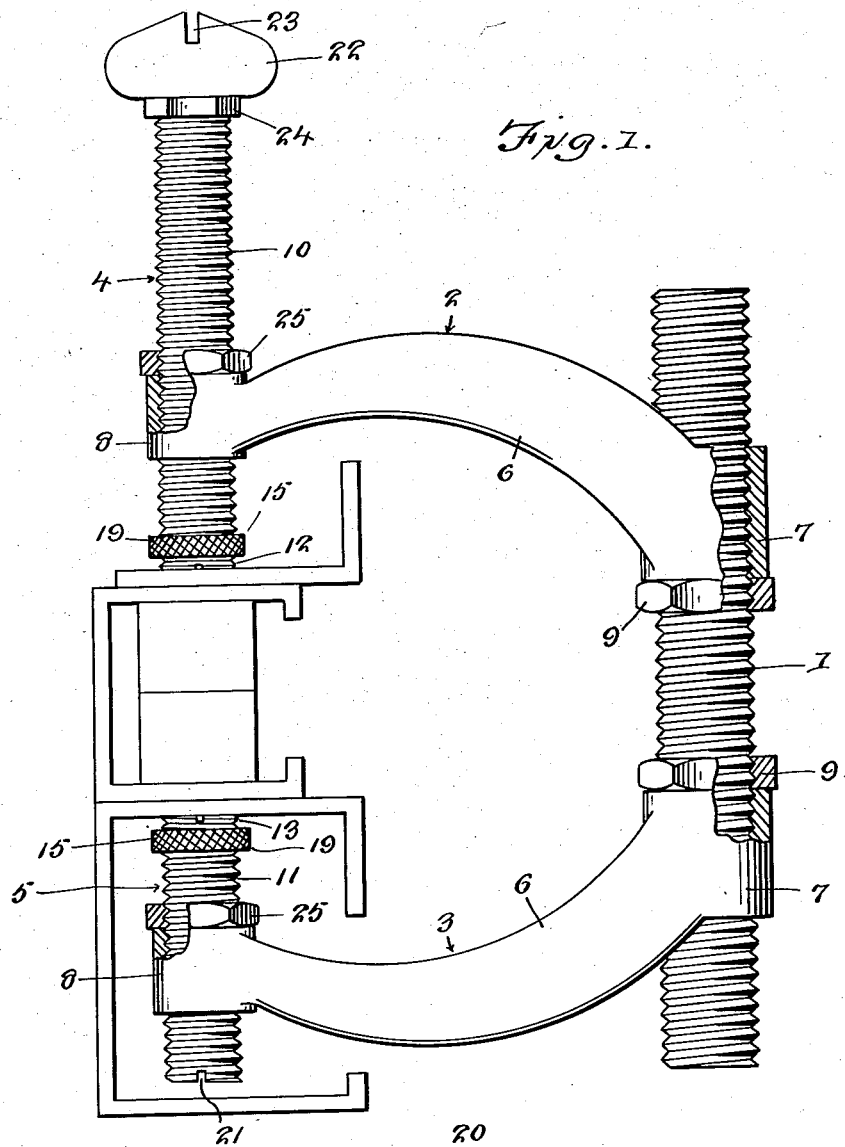
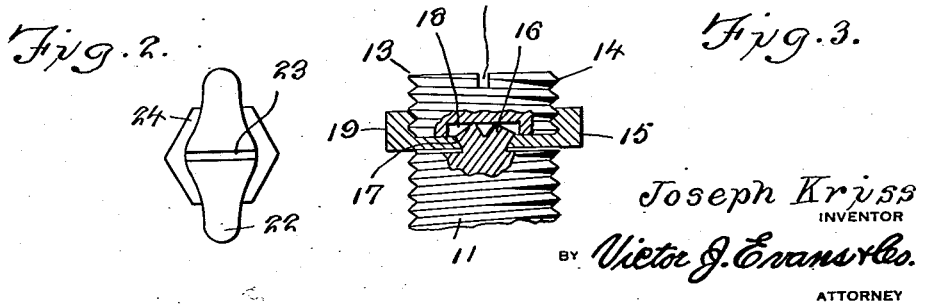
Joseph Kriss
INVENTOR
BY Victor J. Evans & Co.
ATTORNEY Patented Apr. 12, 1938

2,114,227

UNITED STATES PATENT OFFICE 2,114,227

CLAMP

Joseph Kriss, Essex, Md.

Application April 23, 1936, Serial No. 76,034

3 Claims. (Cl. 144—304)

My invention relates to improvements in clamps and the primary object thereof is to provide a simply constructed efficient form of clamp adapted for a wider range of fine adjustments than clamps as commonly constructed and particularly designed for access to the inside of such structural elements as channel struts and braces and the like.

My invention is also designed to provide a clamp characterized as above set forth which is equipped with feet adapted under pressure exerted thereagainst for compensating movement on relatively inclined surfaces to fit flush against such surfaces so that it is not necessary to resort to the use of spacers or shims between the clamp and surfaces of this character.

Another object of my invention is to provide a clamp equipped for exerting pressure against soft or highly polished surfaces without marring such surfaces in any way.

Other and subordinate objects together with the precise nature of my improvements will be readily understood when the following description and claims are read with reference to the drawing accompanying and forming part of this specification.

In the drawing:

Figure 1 is a view in side elevation, parts showing in section, of a clamp constructed according to my invention and illustrating its application.

Figure 2 is a top plan view of a head clamping unit forming part of my improved clamp, and Figure 3 is a fragmentary view partly in side elevation and partly in section illustrating the manner in which said feet are mounted.

Referring to the drawing by numeral, my improved clamp comprises a threaded shaft 1, the threads being preferably right hand, a pair of head and tail stocks 2 and 3, projecting laterally from said shaft for opposed relation, and head and tail clamping units 4 and 5 carried by the head and tail stocks respectively.

The head and tail stocks 2 and 3 each comprise an arm 6, a rear sleeve-like end 7 threaded upon the shaft 1 so that each stock is swingable on the shaft to adjust it toward or from the other and a sleeve-like front end 8 disposed in axial parallelism with the shaft 1. Jam nuts 9 on the shaft 1 provide for locking the stocks in adjusted position. The head and tail clamping units 4 and 5 comprise long and short shank parts 10 and 11, respectively, threaded into the sleeve-like front ends 8 of the head and tail stocks for adjustment toward or from each other, and a pair of cooperating opposed clamping feet 12 and 13 mounted on the inner ends of said shanks respectively. The arms 6 are bowed outwardly of each other to facilitate placing the feet 12 and 13 in straddling relation over an object as will be clear.

The clamping feet 12 and 13 are preferably short cylindrical members of phenol fibre, or similar material, having sufficient resiliency to prevent marring of a surface against which they are pressed and at the same time sufficiently resistant to pressure for clamping purposes. The feet 12 and 13 are externally threaded as at 14 and screwed into circular sockets 15. The sockets 15 are swiveled on the ends of their respective shanks 10 or 11 by means of axial studs 16 on the inner ends of said shanks passing through axial apertures 17 in the sockets. The sockets 15 are spaced from the inner ends of their respective shanks 10 or 11, sufficiently for swiveling action, by said studs 16 which seat against countersinks 18 in the ends of said feet. The sockets 15 are provided with knurled sides 19 and the outer end of the feet 12 and 13 with kerfs 20 for facilitating replacement of said feet. The shank 11 of the tail clamping unit is provided with a kerf 21 in its outer end for screw driver adjustment of the tail clamp. The shank 10 of the head clamp 4 is provided on its outer end with a wing nut 22 for manual adjustment of said clamp, a kerf 23 for screw driver adjustment and a nut 24 for wrench adjustment. A pair of jam nuts 25 are provided on the shanks 10 and 11, respectively, for cooperating with the front ends 8 of the head and tail stocks 2 and 3 to lock the front and rear clamping units in adjusted position.

In using my novel clamp the head and tail units are first preferably adjusted to approximate position by adjustment of the head and tail stocks 2 and 3 in the shaft 1. The tail clamp unit 5 is then adjusted to approximate position and the clamping action effected by means of adjustment of the head clamping unit 4. As the pressure is applied the feet 12 and 13 will rock on their respective shanks 10 and 11 to compensate for any inclination of the surface with which they are engaged relative to the axis of said clamps.

The foregoing clamp is extremely flexible as regards adjustment, is well adapted for placement against parts inaccessible to clamps as commonly constructed, is easy to manipulate and comparatively inexpensive to manufacture.

It is to be understood that the details described are illustrative of a preferred form of my invention and that right is herein reserved to modifications of such details falling within the scope of the claims appended hereto.

What I claim is:

1. In a clamp, a shaft having right hand threads extending throughout its length, a pair of opposed arms having sleeve-like front and rear ends, respectively, the rear ends being threaded onto said shaft for swinging movement of said arms around said shaft, a pair of jam nuts on said shaft for cooperation with said rear ends to lock the arms against swinging movement, a pair of short and long shanks, respectively, threaded into the front ends of the arms for adjustment toward and from each other in end to end relation, jam nuts on said shanks, respectively, cooperating with the front ends of the arms to lock said shanks in adjusted position, a pair of socket members swiveled on opposite ends of the shanks, respectively, and a clamping foot of fibrous material threaded into each of said socket members.

2. In a clamp, a shaft, a pair of opposed arms each having a sleeve-like front and rear end, said rear ends being threaded onto said shaft for swinging movement of said arms around said shaft, a shank threaded into the front end of each arm for adjustment toward and from each other, socket members swiveled to opposed ends of the shanks, and a clamping foot threaded into each of said socket members.

3. A clamp comprising a shaft, a pair of opposed arms each having one of its ends swingingly connected to the shaft, a pair of opposed shanks connected to the opposite ends of the arms, respectively, for adjustment toward and from each other, a pair of studs extending from the opposed ends of the shanks, each stud having a peripheral groove therein, interiorly threaded socket members having centrally disposed openings to receive the studs therethrough and having the marginal edges of the openings disposed in said grooves, and a clamping foot threaded into each of said socket members.

JOSEPH KRISS.